US009009295B2

(12) United States Patent
Akiyama et al.

(10) Patent No.: US 9,009,295 B2
(45) Date of Patent: Apr. 14, 2015

(54) SYSTEM FOR INDICATING TO NETWORK USER THE COST OF SERVICE PROVIDED TO EACH DEVICE ON NETWORK

(75) Inventors: Kazuhito Akiyama, Yamato (JP);
Sanehiro Furuichi, Yamato (JP);
Masami Tada, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 12/843,137

(22) Filed: Jul. 26, 2010

(65) Prior Publication Data

US 2011/0087770 A1 Apr. 14, 2011

(30) Foreign Application Priority Data

Oct. 14, 2009 (JP) ................................. 2009-237386

(51) Int. Cl.
G06F 15/173 (2006.01)
G06F 3/12 (2006.01)
G06Q 10/00 (2012.01)
H04N 1/00 (2006.01)
H04N 1/34 (2006.01)

(52) U.S. Cl.
CPC ............ *G06F 3/1229* (2013.01); *G06F 3/1218* (2013.01); *G06F 3/1224* (2013.01); *G06Q 10/00* (2013.01); *H04N 1/00204* (2013.01); *H04N 1/00244* (2013.01); *H04N 1/00278* (2013.01); *H04N 1/00885* (2013.01); *H04N 1/00891* (2013.01); *H04N 1/00896* (2013.01); *H04N 1/00928* (2013.01); *H04N 1/0097* (2013.01); *H04N 1/344* (2013.01); *G06F 2206/1504* (2013.01); *H04N 2201/0039* (2013.01)

(58) Field of Classification Search
USPC ......................................................... 709/226
See application file for complete search history.

(56) References Cited

U.S. PATENT DOCUMENTS

| 7,386,743 | B2 | 6/2008 | Bahali et al. | |
|---|---|---|---|---|
| 7,461,273 | B2 | 12/2008 | Moore et al. | |
| 7,702,797 | B2 | 4/2010 | Imine | |
| 2004/0217163 | A1 | 11/2004 | Savage | |
| 2005/0144234 | A1* | 6/2005 | Tanaka et al. | 709/205 |
| 2005/0213144 | A1 | 9/2005 | Uejo | |
| 2005/0228884 | A1* | 10/2005 | Hawley | 709/225 |
| 2006/0129665 | A1* | 6/2006 | Toebes et al. | 709/223 |
| 2007/0271475 | A1* | 11/2007 | Hatasaki et al. | 713/324 |

(Continued)

FOREIGN PATENT DOCUMENTS

| JP | 05-108283 | 4/1993 |
|---|---|---|
| JP | 07-152510 | 6/1995 |

(Continued)

*Primary Examiner* — Joseph Greene
(74) *Attorney, Agent, or Firm* — Brevetto Law Group

(57) ABSTRACT

Managing printer and copier server units connected to a network by enabling the user of a personal computer connected to the network to know print costs depending on the environmental load. Server units provide document print and copy services to each network connected client unit, typically personal computers. The server units can operate in any of several operational states, including for example, a standby state, a sleep state and a run state. Upon receiving a service request from the client unit, a management unit estimates the change in operational state for each connected server unit, assigns a priority to the various server units based on the estimated operational state changes, and provides the information for selection by the user requesting the print or copy service.

21 Claims, 9 Drawing Sheets

(56) References Cited

U.S. PATENT DOCUMENTS

| | | |
|---|---|---|
| 2009/0015854 A1* | 1/2009 | Ooba ............................. 358/1.9 |
| 2009/0070604 A1* | 3/2009 | Kumakura ..................... 713/310 |
| 2009/0138753 A1* | 5/2009 | Tameshige et al. ................ 714/4 |
| 2009/0248867 A1 | 10/2009 | Kishimoto |
| 2011/0087905 A1 | 4/2011 | Akiyama |
| 2012/0162495 A1 | 6/2012 | Ogawa |
| 2012/0290702 A1 | 11/2012 | Vincent |
| 2012/0290749 A1 | 11/2012 | Moench |

FOREIGN PATENT DOCUMENTS

| | | |
|---|---|---|
| JP | 07-156512 | 6/1995 |
| JP | 09-231023 | 9/1997 |
| JP | 09-244830 | 9/1997 |
| JP | 10-283130 | 10/1998 |
| JP | 11-110161 | 4/1999 |
| JP | 11305979 A | 11/1999 |
| JP | 2000-020266 | 1/2000 |
| JP | 2000309143 A | 11/2000 |
| JP | 2003-122715 | 4/2003 |
| JP | 2004-074530 | 3/2004 |
| JP | 92007180906 A | 7/2007 |
| JP | 2008210103 A | 9/2008 |
| JP | 2008305262 A | 12/2008 |
| JP | 2003050685 A | 2/2009 |
| JP | 2009065408 A | 3/2009 |
| JP | 2009164689 A | 7/2009 |

* cited by examiner

Figure 4:
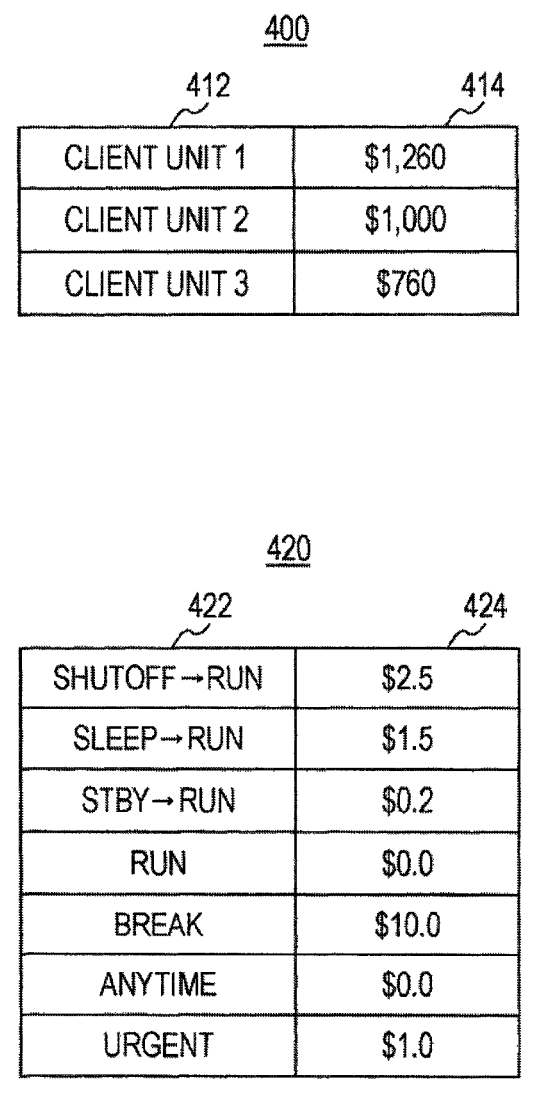

| 412 | 414 |
|---|---|
| CLIENT UNIT 1 | $1,260 |
| CLIENT UNIT 2 | $1,000 |
| CLIENT UNIT 3 | $760 |

420

| 422 | 424 |
|---|---|
| SHUTOFF→RUN | $2.5 |
| SLEEP→RUN | $1.5 |
| STBY→RUN | $0.2 |
| RUN | $0.0 |
| BREAK | $10.0 |
| ANYTIME | $0.0 |
| URGENT | $1.0 |

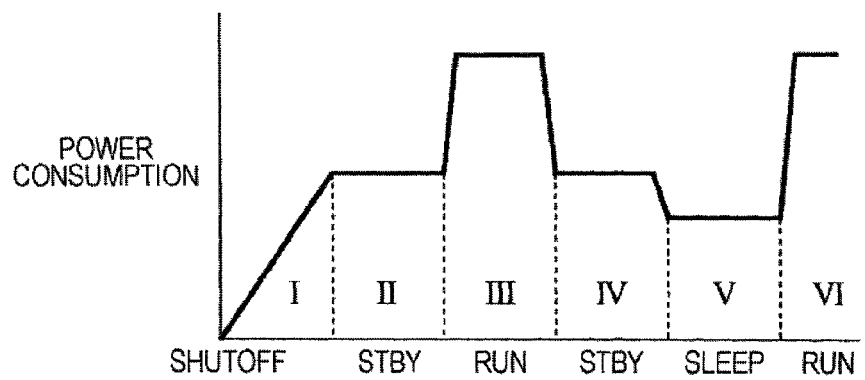

SYSTEM FOR INDICATING TO NETWORK USER THE COST OF SERVICE PROVIDED TO EACH DEVICE ON NETWORK

CROSS-REFERENCE TO RELATED APPLICATIONS

The present application claims priority from, and incorporates by reference herein in its entirety, Japanese patent application number JP2009-237386 filed Oct. 14, 2009 entitled "METHOD, COMPUTER PROGRAM, AND APPARATUS FOR INDICATING TO NETWORK USER COST OF USE OF SERVICE PROVIDED BY EACH DEVICE ON NETWORK."

BACKGROUND

1. Technical Field

Various embodiments of the present invention relate to a group of devices providing services to a client computer on a network, and more specifically, to systems and methods for classifying the devices from the viewpoint of energy utilization efficiency or the operating efficiency of each of the devices and indicating the classifications to the client computer.

2. Description of Related Art

In a typical modern office environment, office devices such as printers, scanners, copiers, or facsimiles are connected to a local area network, and each network user can freely select and use the devices. The user can freely select services provided by the devices according to the user's convenience. For example, in a case where the user prints a document, when a printer is occupied by a preceding job for a long time, the user can appropriately select another printer in a job wait state and cause the other printer to print the document.

However, such a usage pattern in which much discretion is given to users in selecting office devices may not be preferable from the viewpoint of overall energy utilization efficiency of an office. For example, a case can be easily imagined where competition among many users in selecting a high-speed printer in an office decreases the utilization efficiency of other medium-speed and low-speed printers and causes an increase in power consumption due to continuous operation of the high-speed printer.

BRIEF SUMMARY

Various embodiments of the present invention involve systems, methods and computer products for managing multiple server units capable of operating in several operational states that are connected to a network. Upon detecting a service request sent from a client unit to a server unit, a calculation is made estimating the change in the operational state of the server unit that would occur due to execution of the service corresponding to the service request by the server unit. The management unit assigns a priority to the server unit based on the estimated change in the operational state, and stores an indication of the priority and an identifier of the server unit in a storage unit.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIG. 4 depicts an example of the content of the accounting information table 400 and the content of the cost information table 420;

FIG. 5 is a diagram showing changes in power consumption occurring with the transition of the operational state of a copier;

FIG. 6 shows an example of a layout of the server unit information management table;

FIG. 7 shows an example of a layout of a service request to be sent from the client unit 900 to the management unit 200;

DETAILED DESCRIPTION

Figure 1:
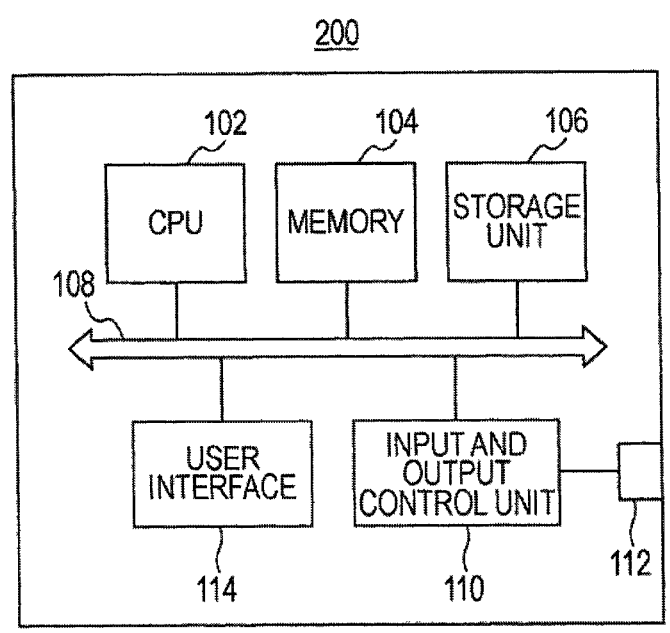
FIG. 1 is an overview of a hardware configuration for implementing a management unit 200 according to various embodiments of the present invention.

Various embodiments disclosed herein provide methods for managing multiple server units connected to a network. A server unit provides services such as a document print service and a document copy service to each client unit that is typically a personal computer, the client unit being connected to a network. Furthermore, a client unit that can send a service request to each of the multiple server units is connected to the network.

The server unit can operate in any of several operational states, and typically has the following functions: (i) a management unit receives a service request sent from the client unit, (ii) the management unit estimates a change in an operational state occurring with execution of the service for the server unit, and (iii) the management unit assigns a priority to the server unit on the basis of the estimated change in the operational state and causes a storage unit to store a correspondence between the priority and an identifier of the server unit.

The management unit may send the identifier of at least one server unit, out of the server units, to the client unit in a manner that depends on the priorities. The client unit may display, on a display unit, the identifier of each server unit sent from the management unit. The client unit may accept selection of the identifier of the server unit by a user and send the service request to one of the server units corresponding to the selected identifier of the server unit. In this case, the change in the operational state of the server unit is, for example, a change in power consumption by the server unit. On the basis of the estimated change in the operational state, the smaller an increase in the power consumption is, the higher the management unit may set the priority of the server unit.

The server unit may be an image forming apparatus, and the change in the operational state may be a change in a resource amount, for example, a sheet or toner remaining amount, that is necessary for an image forming operation and stored in the image forming apparatus. Moreover, the management unit may assign the priority to the server unit in a manner that depends on a resource remaining amount based on the predicted change in the resource amount.

Another aspect of the various embodiments involves a method in which (i) a management unit receives a service request sent from a client unit, (ii) the management unit estimates a change in an operational state occurring with execution of the service for each of a plurality of server units, and (iii) the management unit obtains execution cost of the service for the server unit on the basis of the estimated change in the operational state and sends, to the client unit, a correspondence between the execution cost and an identifier of the server unit.

The management unit may obtain the execution cost by referring to a table of correspondences between changes in the operational state and execution costs, the table being stored in a storage unit. The client unit may display, on a display unit, the correspondences between the respective identifiers of the server units and the execution costs, the correspondences being sent from the management unit. The client unit may accept selection of the identifier of the server unit by a user and send the service request to one of the server units corresponding to the selected identifier of the server unit. The management unit may store, in the storage unit, the execution cost of the service by the server unit selected by the user.

Other features included in various embodiments of the present invention are disclosed in the following paragraphs. The terms used throughout the description and the claims include the following.

(1) Server unit: A server unit typically represents a device, a program, a program module, or an equivalent having a function equivalent to those of these components that is functionally connected to a client unit (described below) via, for example, a communication network and provides a service (described below) to the client unit in response to a service (described below) request from the client unit. For example, for office work purposes, a server unit could be embodied as an image forming apparatus typified by a copier, an image scanner, or a facsimile. However, the business field where a server unit is used is not limited to these fields.

(2) Client unit: A client unit typically represents a device, a program, a program module, or an equivalent having a function equivalent to those of these components that sends a service (described below) request to a server unit described above and receives the service of the server unit, including a personal computer.

(3) Unit: A server unit and a client unit described above are each not necessarily provided in a single housing, regardless of the aforementioned typical examples. Functions in each of the units may be physically distributed as long as the functions of the unit are effective.

(4) Management: Management may be of various types and does not necessarily mean that a management entity controls all the operations of an object to be managed. For example, a management entity may merely selectively monitor some of the operations of an object to be managed. Alternatively, a management entity may send notification of the result of the monitoring to the outside.

(5) Service: A service is a tangible or intangible outcome obtained as the result of the operation of a server unit in response to a request from a client unit and represents, for example, printing of a document, copying of a document, reading of a document, sending and receiving of a document, or calculation.

(6) Operational state: Operational states typically represent the respective states of various operations of an object classified on the basis of a criterion. For example, the operational states of a copier can be classified into states: shutoff, standby, run, and sleep on the basis of a criterion: power consumption (the details of these states are described below). Moreover, the operational states of a computer can be classified into, for example, the user mode and the supervisor mode on the basis of a criterion: a user to whom the computer is available.

(7) Resource: A resource typically represents, for example, an object, information, or energy necessary when a server unit provides a service. For example, in an image forming apparatus, a resource represents, for example, a sheet, toner, or a fixing web (a polymeric material applied to the surface of an image fixing roller). When a server unit includes a battery, a resource may be power stored in the battery.

FIG. 1 is an overview of a hardware configuration for implementing a management unit 200 according to the present invention. The management unit 200 includes a CPU 102, a memory 104, a storage unit 106, an input and output control unit 110, a user interface 114, a bus 108 connecting these components, and a communication port 112. The code of a management program may be stored in the storage unit 106 or may be installed in the memory 104 from an external unit via the communication port 112 and the input and output control unit 110. The code of the management program may be executed by the CPU 102 by being loaded into the memory 104 or may be executed by the CPU 102 while being kept stored in the storage unit 106. The memory 104 may also be used as a temporary storage memory. The user interface 114 may be used, for example, to display the operational state of a communication controller 100 and input the operational mode.

The code of various embodiments may be stored in one or more machine readable non-transitory storage mediums. For example, the code of the management program may be divided into multiple pieces and recorded across several different storage media. Alternatively, some of the divided pieces of code may be recorded in a storage medium in another information processing unit connected to the management unit 200 via the communication port 112 and a communication network (not shown) connected to the communication port 112, and the divided pieces of code may be executed by the CPU 102, cooperating with each other. It is common to distribute code divided among several units and cause the divided pieces of code to cooperate with each other. The system can select any of the various units to execute the piece of code to implement a corresponding function.

The management unit 200 may be physically divided into functional blocks, for example, as described below. Hardware similar to that shown in FIG. 1 may be provided for the individual functional blocks, and the functional blocks may cooperate with each other via the communication port 112. The aforementioned components are illustrative in nature, and may be embodied in the form of various equivalents known to those of ordinary skill in the art.

An operating system operating on a communication controller may, but need not necessarily, be one that supports a graphic user interface multi window environment as standard, such as Windows XP (R), AIX (R), or Linux (R), or another operating system such as μiTRON. The various embodiments are not limited to a specific operating system environment. A client unit 900 can be implemented by using the same hardware as the management unit 200. Moreover, a server unit 1100 can be implemented by using hardware equivalent to that of the management unit 200 as a part thereof. For example, in the case of a copier, a drive component such as a photoconductor drum, a paper transfer roller, a fuser, or a document feeder is connected to the hardware as necessary via the input and output control unit 110.

Figure 2:
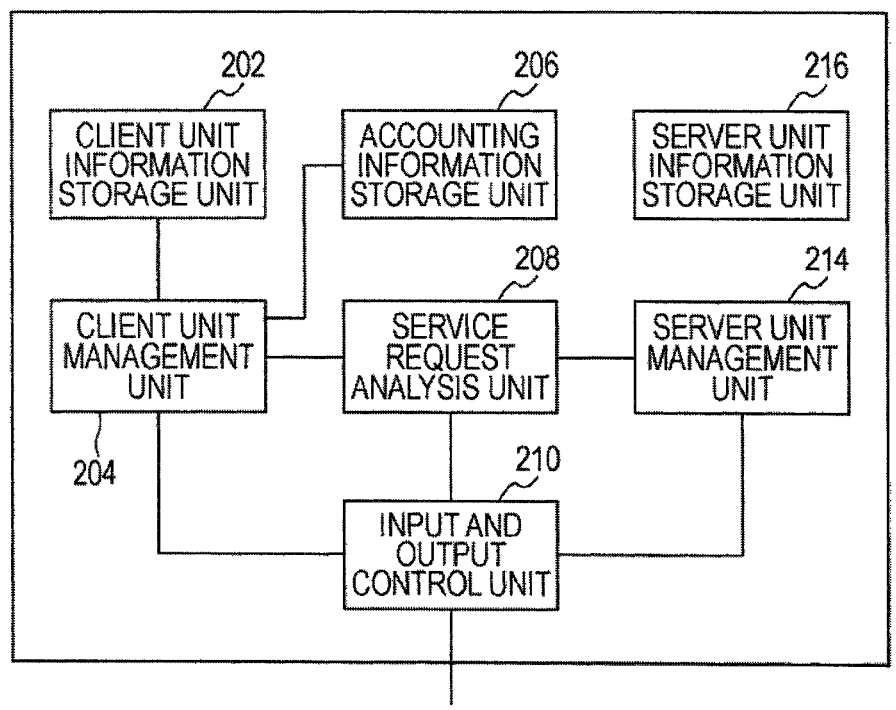
FIG. 2 depicts a functional block configuration of management unit 200.

FIG. 2 depicts a functional block configuration of management unit 200. The functional blocks of FIG. 2 may be implemented with the hardware illustrated in FIG. 1. However, this does not necessarily mean that each of the functional blocks is implemented with a single piece of hardware or software because the functional block is a logical functional block. A functional block may be implemented via cooperation among separate independent pieces of hardware or software, or common hardware or software. The same applies to individual units shown in FIGS. 9 and 11.

An input and output control unit 210 is connected to an external network and controls data transfer between the client unit 900 and the server unit 1100 and data transfer among a client unit management unit 204, a service request analysis unit 208, and a server unit management unit 214 in the management unit 200.

The client unit management unit 204 cooperates with an input and output control unit 906 in the client unit 900. The input and output control unit 906 is communicatively connected to the network, for example, to acquire various types of information on the client unit 900 and update a client unit management table 300 (described below) in a client unit information storage unit 202 and an accounting information table 400 (described below) in an accounting information storage unit 206. The client unit management unit 204 further maintains and manages a cost information table 420 (described below). The client unit management unit 204 further sends information in the client unit information storage unit 202 or the accounting information storage unit 206 to the service request analysis unit 208 in response to a request from the service request analysis unit 208.

Figure 3:
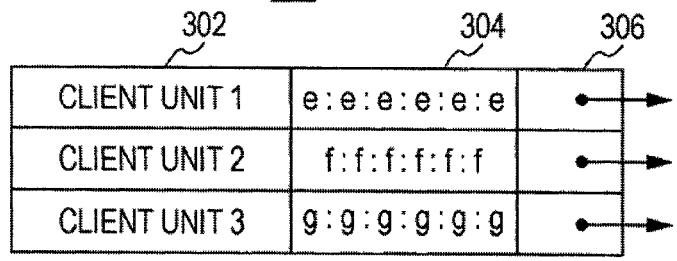
FIG. 3 depicts an example of the content of the client unit management table 300.

FIG. 3 depicts an example of the content of the client unit management table 300. The client unit management table 300 may include identification information 302 of the client unit 900, a network address 304 of the client unit 900, and a pointer 306 to the accounting information of the client unit 900. A user may input the identification information of the client unit 900 and the network address of the client unit 900 via the user interface 114. Alternatively, the input and output control unit 210 in the management unit 200 may automatically collect the network address from the client unit 900 via a network, using the Address Resolution Protocol (ARP).

For the sake of simplification, only a MAC address is shown as a network address. However, other addressing schemes may be used, including for example, communication addresses in another communication layer such as an IP address. The client unit management unit 204 generates the pointer 306 to accounting information when the accounting information table 400 is generated or updated and subsequently manages the pointer 306.

FIG. 4 depicts an example of the content of the accounting information table 400 and the content of the cost information table 420. The accounting information table 400 includes client unit identification information 412 and charge information 414 of the client unit 900. The client unit management unit 204 maintains and manages these pieces of information. The details of collection of these pieces of information by the client unit management unit 204 are described below.

The cost information table 420 includes an event 422 occurring in the server unit 1100 and cost 424 corresponding to the event. The event 422 may be recorded in any form. For example, the event 422 may be a string as shown in the drawing or may be described in a number or a symbol. A user of the management unit 200 may input the cost information table 420 via the user interface 114. Alternatively, the cost information table 420 may be sent from a unit outside the management unit 200 via the input and output control unit 210 and the client unit management unit 204 to be stored in the accounting information storage unit 206. Principles for creating the cost information table 420 will now be described, taking a case where the server unit 1100 is a copier as an example.

A copier generally includes a controller, a user interface such as a liquid crystal panel, a sheet transfer mechanism, an optical system, a photoconductor drum, a toner supply unit, and an image fixing unit. An electronic latent image corresponding to an image of an original is first formed on the photoconductor drum by cooperation between the optical system and the photoconductor drum. An optical system of a digital copier includes a laser irradiation unit, and a latent image is formed by laser irradiation on a photoconductor drum. Then, charged toner is supplied to the electronic latent image on the photoconductor drum, so that an image is formed on the photoconductor drum.

The image is transferred to a sheet by interlocking the sheet transfer mechanism with the photoconductor drum. The sheet, to which the toner image has been transferred, is transferred to the image fixing unit by the sheet transfer mechanism. In the image fixing unit, a heated roller presses the sheet. Resin contained in the toner on the sheet is fused by heat and pressure, so that the toner image is fixed on the sheet. The operational states of the copier including such components can be arranged from the viewpoint of power consumption as described in the following paragraphs.

FIG. 5 is a diagram showing changes in power consumption occurring with the transition of the operational state of a copier. (1) Main power supply shutoff state (hereinafter referred to as the SHUTOFF state): The SHUTOFF state is a state in which the main power supply of a copier is shut off. In this state, power is supplied mainly to a controller board and consumed to maintain a small number of functions, for example, detection of user's operation of a main power supply switch and communication with an external device.

(2) Standby state (hereinafter referred to as the STBY state): The STBY state is a state in which a copier is ready to immediately start an image forming operation upon receiving a print instruction (Section II). In this state, since power is continuously supplied to the fuser, and the optical system, the photoconductor drum, and the toner supply unit are also set operable, power consumption is higher than that in the SHUTOFF state.

(3) Run state (hereinafter referred to as the RUN state): A copier starts an image forming operation upon receiving a print instruction. In this state, the sheet transfer mechanism is brought into full operation, and power is continuously supplied to the fuser so as to compensate for absorption of heat by sheets. Moreover, the optical system, the photoconductor drum, and the toner supply unit are also brought into full operation. Thus, power consumption is higher than that in the STBY state (Sections III and VI). After the image forming operation is completed, the state returns to the STBY state (Section IV).

(4) Sleep state (hereinafter referred to as the SLEEP state): When a copier is put in the STBY state for a predetermined period, for example, power supply to the liquid crystal panel is shut off so as to save power consumption. Power consumption is slightly lower than that in the STBY state (Section V).

(5) Break state (not shown, hereinafter referred to as the BREAK state): When consumables (for example, sheets, toner, and a fixing web) for a copier need to be changed, the copier stops all the operations and transitions to a low-power-consumption state.

The relationships between the operational states of a copier and power consumption are as described above. Thus, the more frequently the operational state changes in a predetermined period, the higher power consumption in the predetermined period is prone to be. This is because additional power is necessary to warm up individual units in a copier when the operational state changes. One of the principles for creating the cost information table 420 is that print cost is low when a change in power consumption occurring with the transition of the operational state of a copier is small. The transition from the SHUTOFF state to the RUN state is evaluated as being costly because power is necessary to warm up all the units, as described above. The transition from the SLEEP state to the RUN state is costlier than the transition from the STBY state to the RUN state. This is based on the comparison of power consumption between the RUN state and the STBY state. A case where the RUN state is maintained means continuous printing, and thus the cost is lowest.

Another principle for creating the cost information table 420 is derived from the viewpoint of the operating rate of a copier. The transition to the BREAK state may occur when consumables for a copier need to be changed. The BREAK state may involve a call for a maintenance person and thus decreases the operating rate of a copier, resulting in high cost from the viewpoint of work efficiency. Moreover, when a print instruction from a user may be executed at any time (ANYTIME in the table), the cost can be evaluated as being low because it is preferable from both the view of power consumption and the viewpoint of the operating rate of a copier to store copy instructions in a queue and execute, when a predetermined number of copy instructions have been stored, the instructions at the same time. On the other hand, when a print instruction from a user needs to be executed immediately (URGENT in the table), the cost can be evaluated as being higher than the cost in a case where ANYTIME is specified because individual components in a copier often need to be warmed up.

The server unit management unit 214 sends and receives data to and from the server unit 1100 via the input and output control unit 210 so as to acquire the state of the server unit 1100, notify the service request analysis unit 208 of the acquired state, and update a server unit information management table 600. The server unit information management table 600 is stored in a server unit information storage unit 216.

FIG. 6 shows the layout of the server unit information management table. The server unit information management table 600 includes server unit identification information 602, a network address 604 of each server unit, an operational state 606 of each server unit, and remaining amounts 608 and 610 of consumables for each server unit. In the case of a copier, consumables may be, for example, a toner remaining amount 608 and a sheet remaining number 610. The server unit identification information 602 and the network address 604 of the server unit 1100 may be input by a user of the management unit 200 via the user interface 114. Alternatively, the input and output control unit 210 in the management unit 200 may automatically collect the network address from the server unit 1100 via a network, using the Address Resolution Protocol (ARP). For example, the server unit management unit 214 may acquire the operational state 606 of each server unit and the remaining amounts 608 and 610 of consumables by sending an operational state inquiry instruction to the server unit 1100 at predetermined intervals. The service request analysis unit 208 analyzes a service request from the client unit 900 to the server unit 1100 to calculate the cost of execution of a corresponding service.

FIG. 7 shows an example of a layout of a service request to be sent from the client unit 900 to the management unit 200. This example is the case in which the client unit 900 is a personal computer, and the server unit 1100 is a copier. A service request includes, for example, a header 710, a personal computer identifier 712, an identifier 714 of a copier that should perform printing, a number 716 of copies to be printed, a print mode 718, print data 720, and a delimiter 722. The print mode may be specification such as ANY or URGENT described above. Moreover, the print mode may include the operational mode of the server unit 1100 such as double-sided printing or single-sided printing. The print data includes an image to be formed by a copier or data for describing an image.

Figure 8:
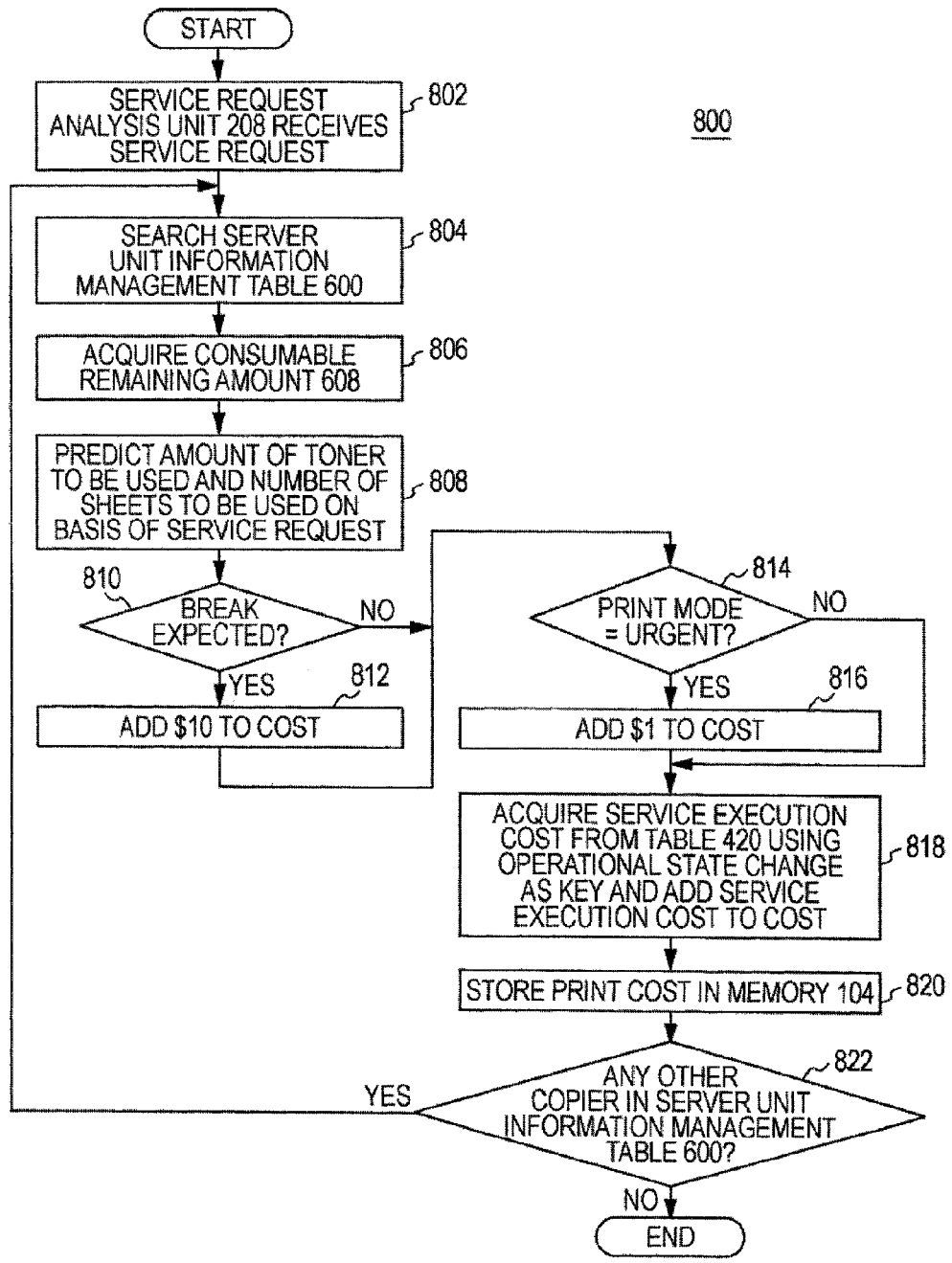
FIG. 8 is a flowchart showing a calculation of service execution cost based on a service request by the service request analysis unit 208.

FIG. 8 is a flowchart showing a calculation of service execution cost based on a service request by the service request analysis unit 208. In response to the service request analysis unit 208 receiving a service request (802), the service request analysis unit 208 calculates the cost of execution of the service request for each server unit registered in the server unit information management table 600. In this case, cost calculation need not necessarily be performed for all the server units. For example, cost calculation may be performed only for a server unit specified in the service request.

The proceeds to block 804 where the service request analysis unit 208 searches the server unit information management table 600, using a server unit identifier as a key (804), to acquire the consumable remaining amount 608 (for example, the toner remaining amount) (806). Upon completing step 806 the method proceeds to 808 where the service request analysis unit 208 predicts the respective amounts of corresponding consumables to be used on the basis of the service request (808). For example, when the service request is a print request shown in FIG. 7, the service request analysis unit 208 may predict the amount of toner to be used from the product of the number of copies to be printed and an estimated amount of toner to be used per sheet. However, the prediction method is not limited to this method. The number of sheets to be used can be obtained from the number 716 of copies to be printed and the print mode 718.

As per block 810, when suspension (BREAK) of the operation of the server unit 1100 is necessary as a result of comparison between the amounts of consumables to be used predicted in this manner and the consumable remaining amounts 608 and 610 (810), the method proceeds to block 812 and the service request analysis unit 208 searches the cost information table 420 to add the cost of BREAK to the total cost (812). Then, in block 814, the service request analysis unit 208 acquires the cost of service execution on the basis of the specification of the operation of the server unit (for example, URGENT or ANY in the example shown in FIG. 7) included in the service request. For example, in block 816 when the print mode 718 was specified in the service request to be URGENT (814), the service request analysis unit 208 adds $1 to the total cost on the basis of the cost information table 420 (816).

Proceeding to block 818, the service request analysis unit 208 acquires the operational state of the server unit 1100 by querying the server unit management unit 214 and acquires service execution cost on the basis of the cost information table 420. When the server unit 1100 is a copier and when the current operational state is STBY, the service request analysis unit 208 adds $0.2 to the total cost (818). In block 820 the service request analysis unit 208 stores the total cost obtained in this manner in the memory 104 as the cost of service request execution by the corresponding server unit 1100 (820). Block 822 ensures the service request analysis unit 208 repeats the aforementioned process for each server unit registered in the server unit information management table 600 (822) to obtain the cost of service request execution for the server unit and store the cost in the memory 104.

Figure 9:
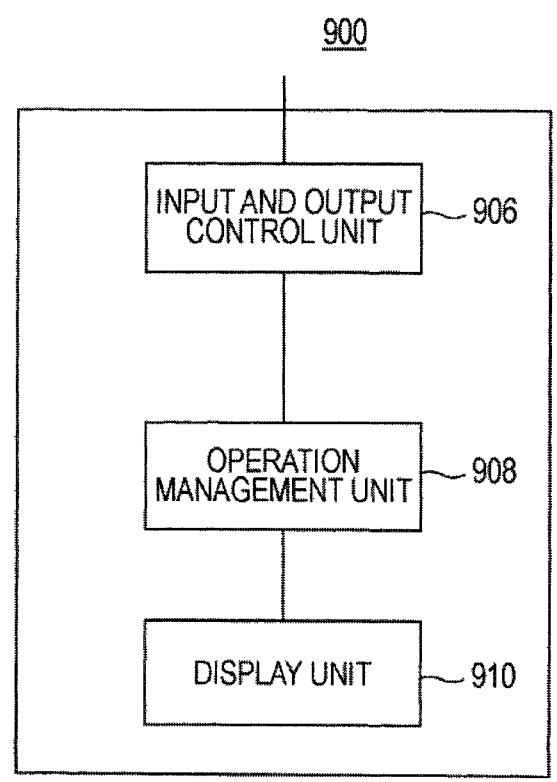
FIG. 9 is a block diagram showing the system configuration of the client unit 900.

FIG. 9 is a block diagram showing the system configuration of the client unit 900. The client unit 900 may be, for example, a personal computer. The input and output control unit 906 is connected to an external network and sends and receives data to and from the server unit 1100 or the management unit 200. For example, the input and output control unit 906 can send address information in response to an address query according to the ARP from these other units. An operation management unit 908 manages all the operations of the client unit 900. For example, the operation management unit 908 creates a service request as shown in FIG. 7 in response to specification of the server unit 1100 and specification of service content by a user. A created service request may be sent to the management unit 200 before being sent to the server unit 1100 so as to cause the management unit 200 to calculate service request execution cost.

Figure 10:
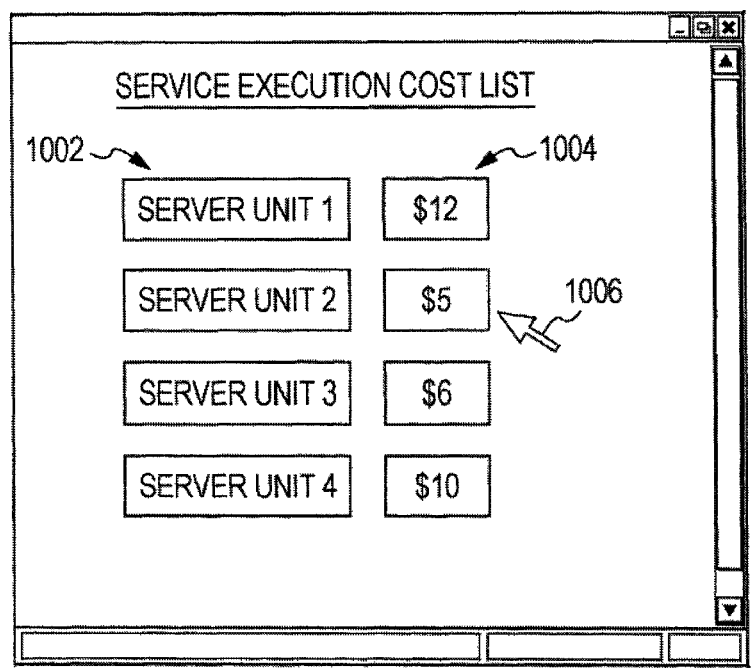
FIG. 10 depicts a typical service execution cost list.

FIG. 10 depicts a typical service execution cost list. The operation management unit 908 may display service execution cost (1004) for each server unit (1002) received from the management unit 200 on a display unit 910 (FIG. 10). Furthermore, when a user has selected (1006) one of the server units 1002, using input means such as a mouse, the operation management unit 908 re-creates a service request shown in FIG. 7 and sends the re-created service request to the corresponding server unit 1100. Re-creation means, for example, replacing the printing copier identifier 714 shown in FIG. 7 with the identifier of a new server unit that a user has selected, referring to a service execution cost list.

Figure 11:
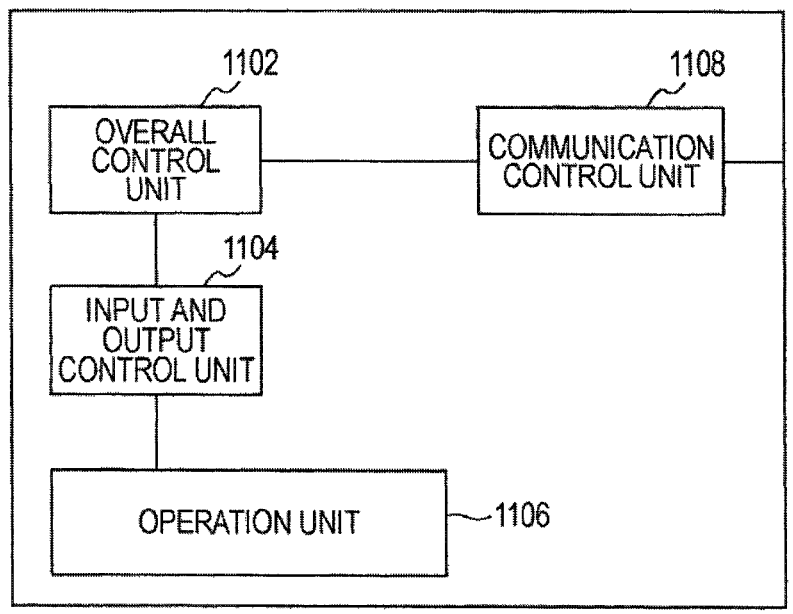
FIG. 11 is a block diagram showing a typical system configuration for the server unit 1100.

FIG. 11 is a block diagram showing a typical system configuration for the server unit 1100. An overall control unit 1102 performs overall control of individual units in the server unit 1100. A communication control unit 1108 is connected to an external network and sends and receives data to and from the management unit 200 and the client unit 900. An input and output control unit 1104 transfers, to an operation unit 1106, an operation control instruction to the operation unit 1106 from the overall control unit 1102 and further transfers, to the overall control unit 1102, various types of signals from the operation unit 1106. In embodiments with the server unit 1100 implemented as a copier, the control board corresponds to the overall control unit 1102 and the communication control unit 1108, the I/O corresponds to the input and output control unit 1104, and the image forming unit including a sheet transfer unit, a photoconductor drum, and a fuser corresponds to the operation unit 1106.

The overall control unit 1102 acquires the state of each component included in the operation unit 1106 via the input and output control unit 1104 and returns the state to the management unit 200 in response to a request from the management unit 200. For example, when the management unit 200 has queried the overall control unit 1102 about the toner remaining amount, the overall control unit 1102 acquires the toner remaining amount by detecting a signal from a toner remaining amount sensor in the operation unit 1106 and returns the toner remaining amount to the management unit 200.

The overall control unit 1102 further keeps the operational state (for example, SHUTOFF, STBY, RUN, SLEEP, or BREAK) of the server unit 1100 and sends the operational state to the management unit 200 in response to a query from the management unit 200. Alternatively, the server unit 1100 may autonomously and regularly send, to the management unit 200, for example, the operational state of the server unit 1100 and the respective states of the individual components in the operation unit 1106. The overall control unit 1102 further provides a service by driving the operation unit 1106 upon receiving a service request from the client unit 900.

Various details of the respective operations of the management unit 200, the client unit 900, and the server unit 1100 are as described above. The gross outline of interactions between these units will now be considered using FIGS. 12 and 13. In the following description, it is assumed that the client unit 900 is a personal computer, and the server unit 1100 is a copier.

Figure 12:
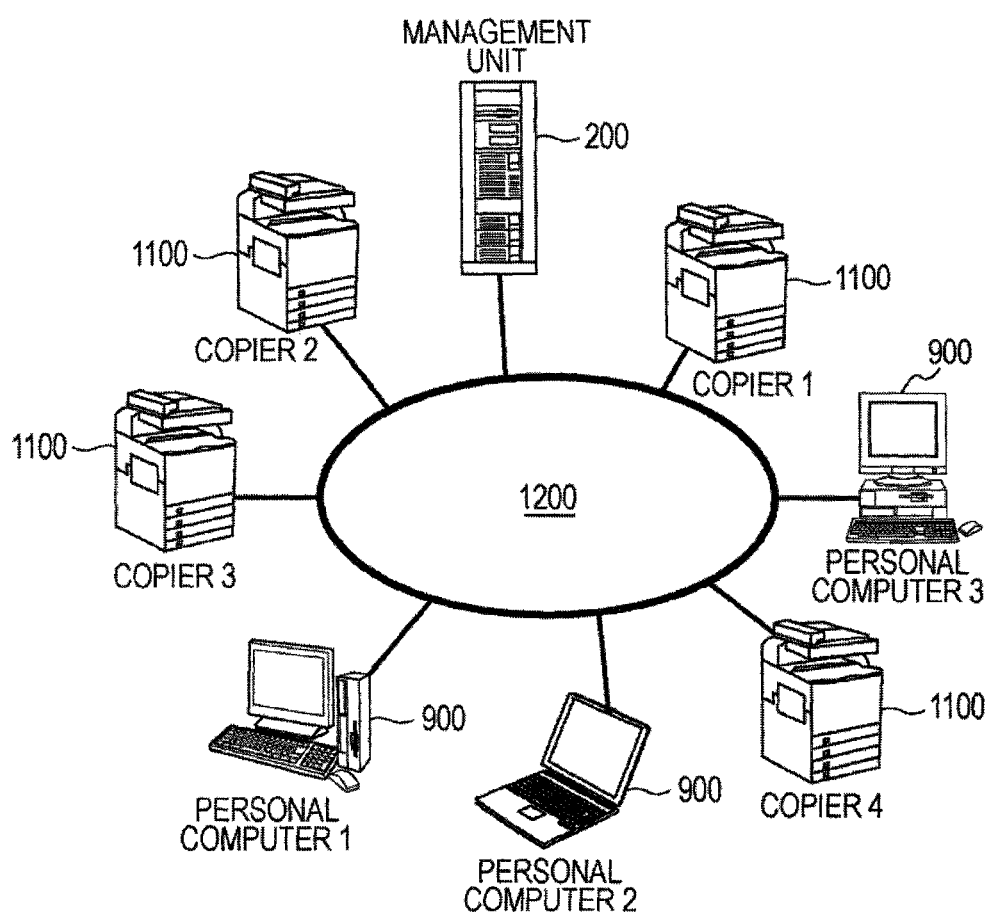
FIG. 12 is a diagram showing an example configuration of a network 1200 to which the management unit 200, three personal computers 900, and four copiers 1100 are connected.
Figure 13:
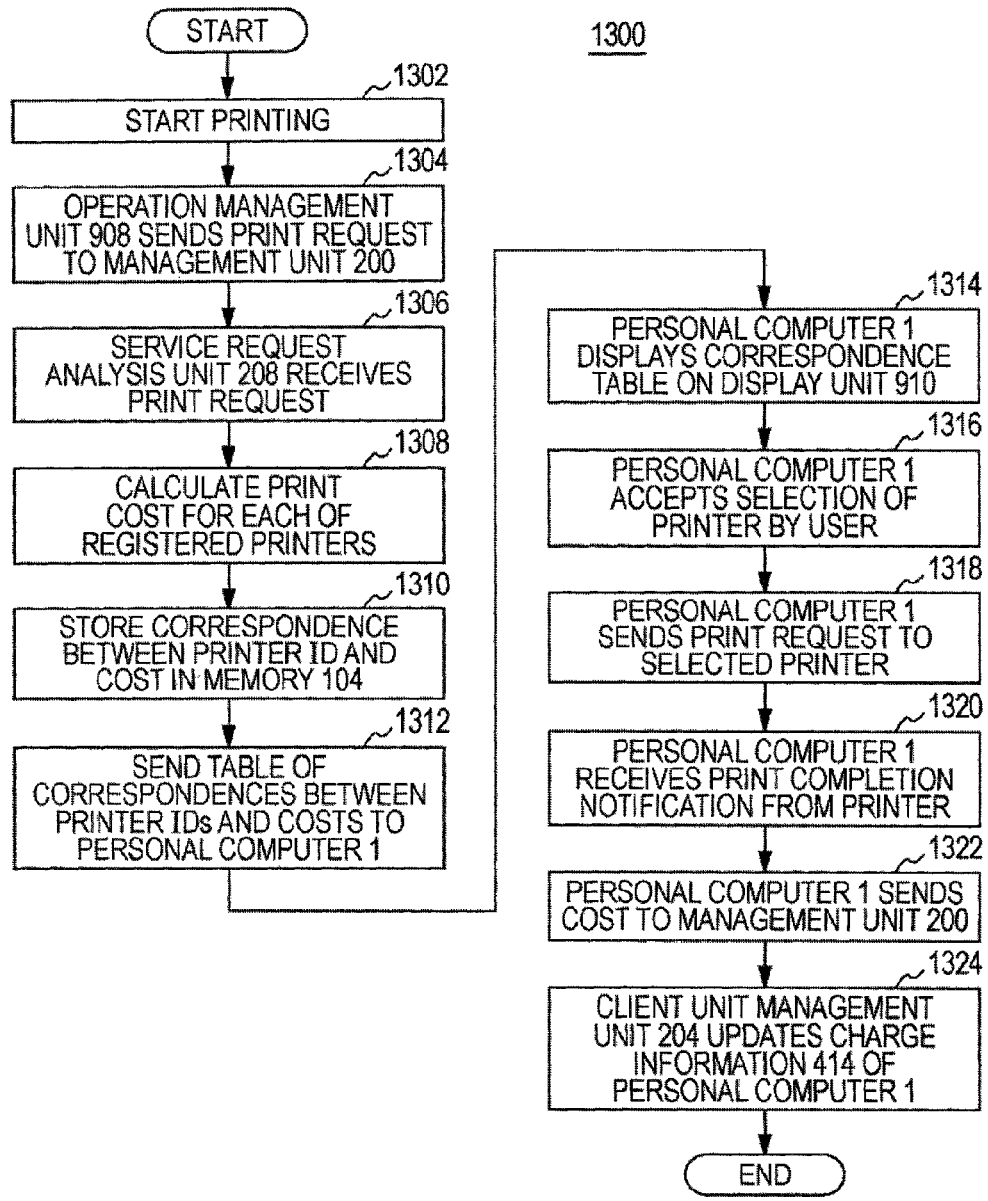
FIG. 13 is a flowchart of interactions between the management unit 200, the personal computers 900, and the copiers 1100 of FIG. 12.

FIG. 12 is a diagram showing an example configuration of a network 1200 to which the management unit 200, three personal computers 900, and four copiers 1100 are connected. FIG. 13 is a flowchart of interactions between the management unit 200, the personal computers 900, and the copiers 1100. Turning to block 1302 of FIG. 13, it is assumed that the personal computer 1 sends an instruction to print a document to the copier 1 specified by a user (1302). In block 1304 the operation management unit 908 in the personal computer 1 first sends, for example, a print request shown in FIG. 7 to the management unit 200, as described above (1304). In block 1306 the service request analysis unit 208 in the management unit 200 receives the print request (1306).

Proceeding to block 1308 the service request analysis unit 208 obtains print request execution cost for each of the copiers 1 to 4 registered in the server unit information management table 600 according to the aforementioned procedure (1308). In block 1310 the service request analysis unit 208 stores, in the memory 104, each of the execution costs in association with the corresponding copier identifier 602 (1310). In block 1312 the service request analysis unit 208 further sends the execution costs and the copier identifiers 602, which have been stored, to the personal computer 1 (1312). In block 1314 the operation management unit 908 in the personal computer 1 displays the execution costs and the copier identifiers 602, which have been received, on the display unit 910 (1314). In this manner, a user of the personal computer 1 can know the cost of execution of a user's desired print request by each copier.

In the example depicted in FIG. 13, for the sake of simplification, costs represent those estimated on the basis of the aforementioned principles according to various embodiments from the viewpoint of power consumption and/or the viewpoint of the operating rate of a copier. Hitherto known costs based on other viewpoints, for example, the maintenance guarantee charge and lease charge of a copier, may be added to these costs also. The user of the personal computer 1 can select a copier that should perform printing, referring to the service execution cost list (1000) shown in FIG. 10. In blocks 1316 and 1318, when the user has selected (1006) of FIG. 10, for example, the copier 2 (1316), a print execution instruction (FIG. 7) to the copier 2 is re-created, and the re-created instruction is sent to the copier 2 (1318).

In block 1320, once the execution of the instruction by the copier 2 is completed, the copier 2 sends a print completion notification to the personal computer 1 (1320). According to block 1322 the operation management unit 908 in the personal computer 1 sends the cost corresponding to the copier 2 to the management unit 200 (1322). In block 1324 the client unit management unit 204 in the management unit 200 updates the accounting information table 400 in the accounting information storage unit 206 on the basis of the received cost (1324).

In the aforementioned embodiment, a personal computer first sends a print execution instruction to the management unit 200, and then, the management unit 200 analyzes the instruction and sends a service execution cost list to the personal computer. Then, the personal computer sends a print execution instruction to a copier selected by a user. Alternatively, after the personal computer may send a print execution instruction to the management unit 200, the management unit 200 may send the print execution instruction to a copier most suitable from the viewpoint of print execution cost. In a combination of the management unit 200 or the client unit 900 and the server unit 1100 according to various embodiments, in response to a user of the client unit 900 sending a service request to the server unit 1100, the corresponding service execution cost is estimated, and the user is notified of the service execution cost, as described above. Thus, the user can select the server unit 1100, which can execute the corresponding service at a desired cost.

Since the cost can be evaluated from the viewpoint of, for example, power consumption or the operating efficiency of the server unit 1100, the present invention can also contribute to an improvement in operating efficiency and energy saving in an office.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

What is claimed is:

1. A method for managing a plurality of server units connected via a network to a management unit, wherein the plurality of server units are image forming apparatuses, the method comprising:
    detecting, at the management unit, a client unit sending a service request for a first server unit, the first server unit being one of the plurality of server units connected to said network configured to operate in any of a plurality of operational states, said client device having an associated display unit;
    calculating an estimated change in an operational state of said first server unit that would occur due to execution of the service corresponding to the service request by the first server unit, wherein the change in the operational state is a change in a resource amount due to an image forming operation by the image forming apparatus;
    assigning, by the management unit, a first priority to the first server unit based on the estimated change in the operational state of the first server unit;
    calculating an estimated change in an operational state of a second server unit among said plurality of server units connected to the network that would occur due to execution of the service corresponding to the service request by the second server unit;
    assigning, by a management unit, a second priority to the second server unit based on the estimated change in the operational state of the second server unit;
    storing in a storage unit an indication of the first priority and a first identifier of said first server unit, and an indication of the second priority and a second identifier of said second server unit; and
    sending to the client unit, by the management unit, a list comprising the first identifier and the first priority of the first server unit, and the second identifier and a second priority of a second server unit of the plurality of server units, said list being in a format displayable on the display unit;
    wherein said first priority and said second priority are respectively based on operational state changes of the first server unit and the second server unit as calculated by the management unit; and
    wherein for the assigning of the first and second priorities, a higher priority is associated with a smaller increase in the power consumption and a lower priority is associated with a larger increase in the power consumption.

2. The method according to claim 1, further comprising:
    displaying the first and second identifiers sent from the management unit on a display unit of the client unit in a manner indicating the first priority of the first server unit and the second priority of the second server unit.

3. The method according to claim 1, further comprising:
    detecting a selected identifier input by a user at the client unit selecting either the first identifier or the second identifier; and
    sending the service request to either the first server unit or to the second server unit, depending upon the selected identifier.

4. The method according to claim 1, wherein the change in the operational state of the first server unit is associated with a change in power consumption by the first server unit.

5. The method according to claim 1, wherein the management unit assigns the first priority to the first server unit in a manner inversely related to a predicted change in the resource amount.

6. A method for managing a plurality of server units connected via a network to a management unit and a client unit connected to the network, the client unit being configured to send a service request to any of the plurality of server units, and the server unit being configured to operate in any of a plurality of operational states, said method comprising:
    calculating an estimated change in an operational state due for execution of the service by the server unit, wherein the change in the operational state is a change in a resource amount due to an image forming operation by the image forming apparatus;
    obtaining an execution cost of the service for said server unit based on the estimated change in the operational state; and sending, from the management unit to the client unit, a list comprising an indication of the execution cost and an identifier of said server unit, said list being in a format displayable on the display unit;

wherein the plurality of server units are image forming apparatuses; and wherein for the assigning of the first and second priorities, a higher priority is associated with a smaller increase in the power consumption and a lower priority is associated with a larger increase in the power consumption.

7. The method according to claim 6, further comprising:
obtaining, by the management unit, the execution cost by referring to a table of correspondences between changes in the operational state and execution costs, the table being stored in a storage unit.

8. The method according to claim 6, further comprising:
obtaining an execution cost of the service for each of the plurality of server units; and
displaying, on a display unit of the client unit, correspondences between respective identifiers of the plurality of server units and the execution costs of each of the plurality of server units, the correspondences being sent from the management unit.

9. The method according to claim 7, detecting an input made by a user at the client indicating an identifier of a selected server unit among said plurality of server units; and sending the service request to the selected server unit.

10. The method according to claim 9, storing an execution cost of the service for the selected server unit selected by the user.

11. A management apparatus configured to manage a plurality of server units and a client unit, the client unit being configured to send a service request to any of the plurality of server units, each of the plurality of server units being configured to operate in any of a plurality of operational states, the management apparatus comprising:
a network connection connecting the management apparatus to a network, said network being connected to each of the plurality of server units and the client unit;
means for calculating an estimated change in an operational state occurring due to execution of the service for each of the plurality of server units, wherein the change in the operational state is a change in a resource amount due to an image forming operation by the image forming apparatus; and
means for assigning a priority to each of the plurality of server units based on the estimated change in the operational state for each of the plurality of server units;
a storage unit configured to store an indication of the priority of each of the plurality of server units and an identifier associated with each of the plurality of server units; and
means for sending to the client unit a list comprising an indication of the priority of each of the plurality of server units, said list being in a format displayable on the display unit;
wherein the plurality of server units are image forming apparatuses; and
wherein for the assigning of the first and second priorities, a higher priority is associated with a smaller increase in the power consumption and a lower priority is associated with a larger increase in the power consumption.

12. A computer program product comprising a machine readable non-transitory medium including a program of instructions for managing a plurality of server units connected via a network to a management unit, wherein the plurality of server units are image forming apparatuses, and wherein the program of instructions upon being executed on a computer causes the computer to perform activities comprising:
detecting the management unit, a client unit sending a service request for a first server unit, the first server unit being one of the plurality of server units connected to said network capable of operating in a plurality of operational states, said client device having an associated display unit;
calculating an estimated change in an operational state of said server unit that would occur due to execution of the service corresponding to the service request by the first server unit, wherein the change in the operational state is a change in a resource amount due to an image forming operation by the image forming apparatus;
assigning, by a management unit, a first priority to the first server unit based on the estimated change in the operational state of the first server unit;
calculating an estimated change in an operational state of a second server unit among said plurality of server units connected to the network that would occur due to execution of the service corresponding to the service request by the second server unit;
assigning, by a management unit, a second priority to the second server unit based on the estimated change in the operational state of the second server unit;
storing in a storage unit an indication of the first priority and a first identifier of said first server unit, and an indication of the second priority and a second identifier of said second server unit; and
sending to the client unit, by the management unit, a list comprising the first identifier and the first priority of the first server unit, and the second identifier and a second priority of a second server unit of the plurality of server units;
wherein said first priority and said second priority are respectively based on operational state changes of the first server unit and the second server unit as calculated by the management unit, said list being in a format displayable on the display unit; and
wherein for the assigning of the first and second priorities, a higher priority is associated with a smaller increase in the power consumption and a lower priority is associated with a larger increase in the power consumption.

13. The method according to claim 1, wherein the first and second priorities are based on execution costs associated with the estimated changes in the operational states of the first and second server units, a higher priority being associated with a smaller execution cost and a lower priority is associated with a larger execution cost.

14. The method according to claim 1, wherein the plurality of operational states of the image forming apparatuses comprise a shutoff state, a standby state, a run state and a break state.

15. The method according to claim 6, wherein the plurality of operational states of the image forming apparatuses comprise a shutoff state, a standby state, a run state and a break state.

16. The management apparatus according to claim 11, wherein the plurality of operational states of the image forming apparatuses comprise a shutoff state, a standby state, a run state and a break state.

17. The computer program product according to claim 12, wherein the plurality of operational states of the image forming apparatuses comprise a shutoff state, a standby state, a run state and a break state.

18. The method according to claim 1, further comprising:
  receiving, in response to sending said to the client unit, an indication of a user selection of either the first server unit or the second server unit for executing the request.

19. The method according to claim 9, further comprising:
  receiving, in response to sending said to the client unit, an indication of a user selection of either the first server unit or the second server unit for executing the request.

20. The management apparatus according to claim 11, wherein said network is further configured to receive, in response to sending said to the client unit, an indication of a user selection of either the first server unit or the second server unit for executing the request.

21. The computer program product according to claim 12, wherein the activities further comprise:
  receiving, in response to sending said to the client unit, an indication of a user selection of either the first server unit or the second server unit for executing the request.

\* \* \* \* \*